March 28, 1939.  V. W. KLIESRATH  2,152,060

CONTROL MECHANISM FOR MOTOR VEHICLES

Filed Aug. 15, 1931  3 Sheets-Sheet 1

INVENTOR.
VICTOR W. KLIESRATH
BY H. O. Clayton
ATTORNEY.

March 28, 1939.  V. W. KLIESRATH  2,152,060
CONTROL MECHANISM FOR MOTOR VEHICLES
Filed Aug. 15, 1931   3 Sheets-Sheet 2

INVENTOR.
VICTOR W. KLIESRATH
BY H. O. Clayton
ATTORNEY.

March 28, 1939.   V. W. KLIESRATH   2,152,060
CONTROL MECHANISM FOR MOTOR VEHICLES Filed Aug. 15, 1931   3 Sheets-Sheet 3

INVENTOR.
VICTOR W. KLIESRATH
BY
ATTORNEY

Patented Mar. 28, 1939

2,152,060

UNITED STATES PATENT OFFICE 2,152,060

CONTROL MECHANISM FOR MOTOR VEHICLES

Victor W. Kliesrath, South Bend, Ind., assignor to Bragg-Kliesrath Corporation, South Bend, Ind., a corporation of New York Application August 15, 1931, Serial No. 557,242

9 Claims. (Cl. 192—.01)

This invention relates in general to control mechanism for motor vehicles and more particularly to the conventional throttle, brake and clutch controls.

In operating a motor vehicle one of the most difficult things to learn and perform properly is the coordinated action between the throttle control of the carburetor, the clutch, the gear shift mechanism and the brake. The clutch is thrown out for each operation of gear shifting and thrown in or engaged as the engine is accelerated to drive the car. The brake is usually applied after the clutch is disengaged, and if applied with the clutch engaged and the car in gear, either the clutch or brake must be released at the proper time to avoid stalling the engine. While in time this becomes a matter of routine for the skilled driver, it nevertheless requires considerable skill to effect a proper timing of the various operations and such control is particularly difficult for the beginner to grasp. Also, there are times when the skilled driver feels the burden of the unrelated cycle of operations, particularly when the cycle is interrupted or held in suspension as with the stop light traffic systems now in vogue.

It is, therefore, the principal object of the invention to improve the control of a motor vehicle by providing simple and effective means to synchronize the action of the several separate control mechanisms commonly employed, and to simplify the operation of such control by combining the means for actuating the throttle, brake and clutch in a single manually operable member.

A further object is to provide a manually operable member, preferably a foot operated treadle, constructed in two relatively movable parts, the movement of one part by the toe of the operator effecting a synchronized operation of the throttle and clutch and the movement of the remaining part by the heel of the operator effecting an operation of the brake.

Yet another object of the invention is to provide power operated means, preferably of the vacuum type, for operating the clutch and brake, said means being under the control of the aforementioned two-part manually operable member.

A further object is to provide manually operable means for actuation of either the clutch or the brake, or both, said means supplementing the aforementioned two-part treadle control of these mechanisms.

A further object of the invention is to simplify the present day automotive control mechanism by providing but a single foot operated control unit, which unit is projected from the floorboard in a position to be conveniently operated by the right foot of the driver.

Other objects of the invention and desirable details of construction and combinations of parts will become apparent from the following detailed description of certain embodiments of the invention taken in conjunction with the accompanying drawings, in which.

Figure 1:
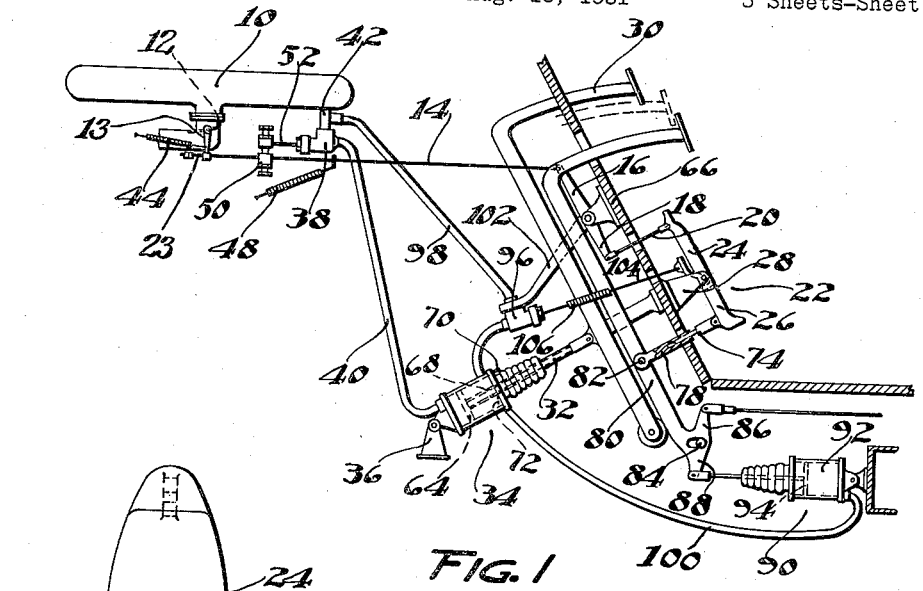
Figure 1 is a diagrammatic view disclosing certain of the controlled and controlling elements of the invention and their relation one to another, the clutch, brake and throttle being disclosed in their released positions.
Figure 3:
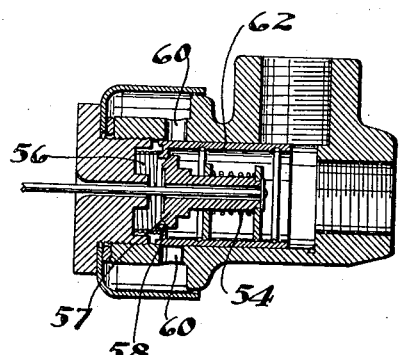
Figure 4:
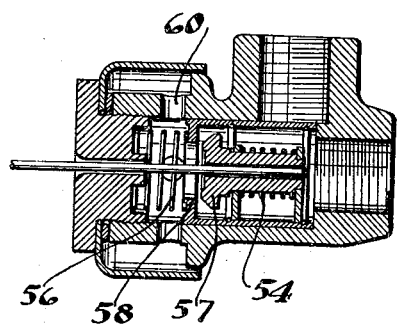
Figure 8:
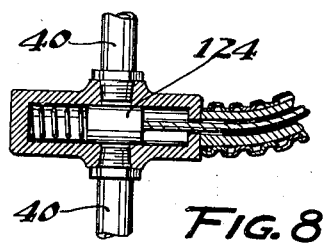
Figure 5:
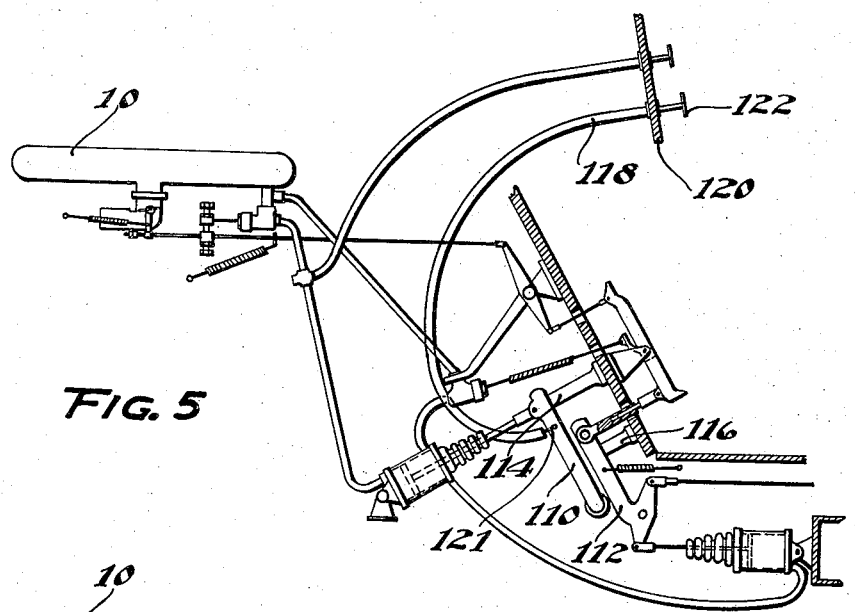
Figure 6:
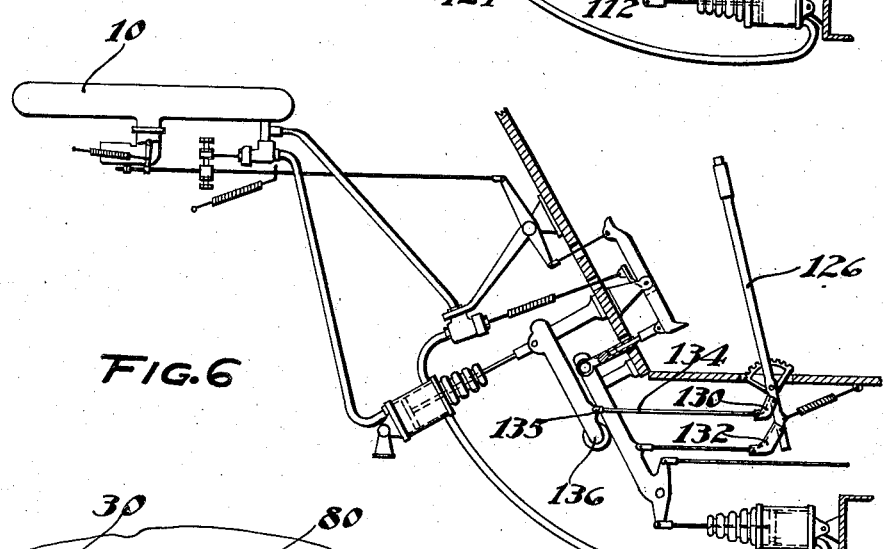
Figure 7:
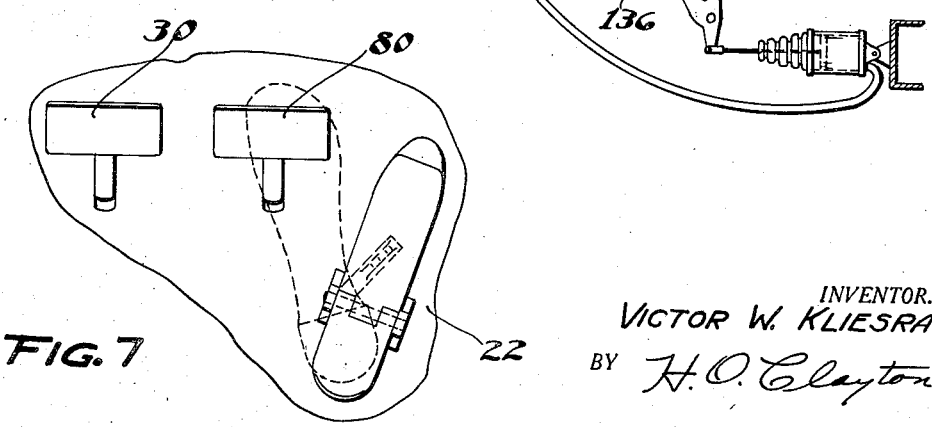
Figure 9:
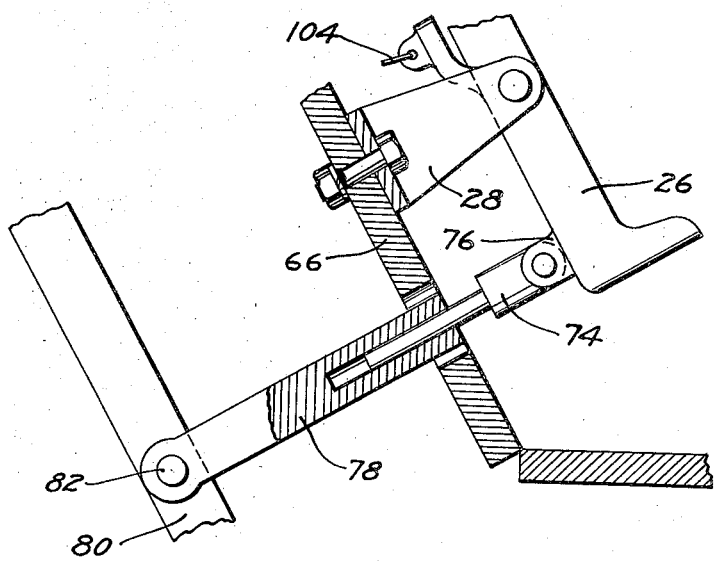
Figure 10:
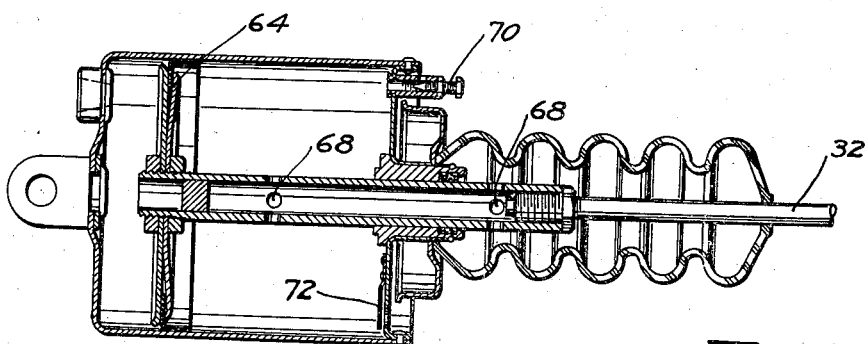
Figure 11:
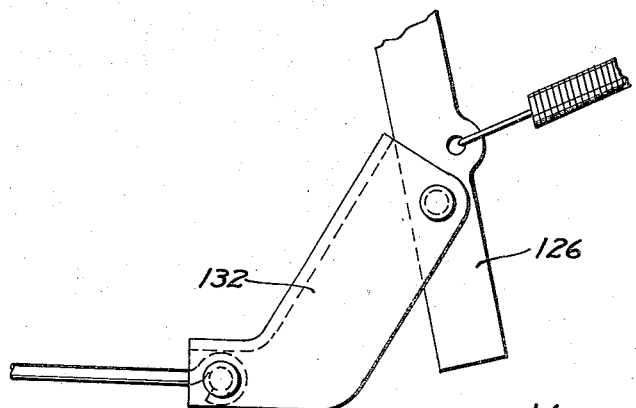

Figures 3 and 4 disclose, in section, the power actuator control valve for the clutch and brake mechanisms in the open and closed positions respectively;

Figure 5 is a view similar to that of Figure 1 disclosing a modified form of control mechanism;

Figure 6 discloses yet another form of control mechanism embodying a manually operated hand lever for supplementing the treadle control of the brake and clutch;

Figure 7 discloses diagrammatically another modified form of cooperating treadle and brake pedal control structure;

Figure 8 discloses, in detail, the structure of the cut-out valve adapted to render the power operator for the clutch inoperative;

Figure 9 discloses in detail a connection between the heel operated portion of the treadle member and the brake pedal;

Figure 10 discloses in detail the details of the clutch operating power actuator; and Figure 11 discloses the details of the lost motion connection between the manually operable emergency lever member of Figure 6 and the clutch and brake operating lever members.

Referring now to the invention in detail, there is disclosed in Figure 1 the conventional intake manifold 10 of an internal combustion engine. A throttle valve 12, operable by a crank 13, is arranged to be opened by link 14 operated by inter-connected cranks 16 and 18, the latter being actuated by a link 20 connected to a two-part treadle member 22. A lost motion connection 23 between crank 13 and link 14 is provided for a purpose to be described hereinafter. The toe and heel parts 24 and 26 of the treadle have a hinged mounting upon a common member 28, said member being secured to the floorboard. As will be clearly brought out in the description to follow, this two-part treadle member is adapted to control the operation of the engine, the clutch and the brakes of the automotive vehicle.

To the conventional clutch pedal 30 there is pivotally secured the connecting rod 32 of a vacuum operated power actuator 34, the casing of which is rigidly secured to the chassis, or other rigid mounting, by bracket 36. The operation of the actuator is controlled by a rigidly mounted three-way valve 38, Figures 3 and 4, in fluid transmitting connection with the actuator by conduit 40 and with the manifold by the supporting conduit 42.

In the closed throttle position of the parts disclosed in Figures 1 and 5, the valve being disclosed in the latter figure, a tension spring 44 serves to keep the butterfly 46 of the throttle or carburetor closed and a second tension spring 48 serves, through a set screw connection 50, to maintain a flexible valve operating member 52 in tension to collapse valve springs 54 and 56 and crack the valve. In this cracked position atmospheric valve member 57 is seated at 58, Figure 3, to close off the vent to atmosphere via openings 60, and sleeve valve member 62 is moved to intercommunicate the conduits 40 and 42 to evacuate the actuator, holding the piston 64 in the dotted line position of Figure 1 and maintaining the clutch disengaged. This power release operation of the clutch is made possible by virtue of the evacuated condition of the manifold at closed throttle, and it is at closed throttle that a release of the clutch is desired. The pumping action of the engine pistons at closed throttle insures such an evacuation of the manifold. In this off position of the parts the toe operated member 24 is held in fixed position with respect to the floorboard 66 as disclosed in Figure 1, and the operator's foot may be removed from the treadle without disturbing the position of the aforementioned control parts. It will also be noted that by virtue of the lost motion connection 23 the throttle 12 is closed by the spring 44 before the valve is opened, as above described, to disengage the clutch.

Referring now to the opening of the throttle and the subsequent clutch engagement, depression of the treadle member 24 serves to place the link 14 in tension to first close the valve 38, subsequent movement of member 24 serving to open the throttle. In describing this operation of the valve, the springs 56 and 54 successively move parts 62 and 57 to first cut off the vacuum and then vent the actuator, Figure 4, to permit engagement of the clutch. This engagement is automatically dampened or controlled to simulate manual clutch operation by virtue of the dashpot effect on the non-suction side of the actuator piston 64. As disclosed in Figure 1, relatively large atmospheric openings 68 in the connecting rod permit a rather rapid clutch plate movement during the first part of the stroke, and a calibrated needle valve 70 effects the buffing action just before the plates engage. A flap valve 72 is also provided to obviate any drag upon the piston during the disengaging operation. The details of both the actuator and valve, however, are not claimed herein, as the same forms the subject matter of application No. 540,827, filed May 29, 1931, and application No. 568,082, filed October 10, 1931.

The full lines of Figure 1 illustrate the clutch pedal in its released position, the engaged position being indicated by dotted lines. When it is desired to decrease the engine speed by closing the throttle and at the same time release the clutch effecting what is now known as "freewheeling", the foot pressure upon the toe member 24 of the treadle is reduced, permitting the spring 48 to move said member 24 back to its neutral or off position. As the throttle is again opened, as for example after a gear shifting operation, the clutch is again automatically engaged.

Figure 2:
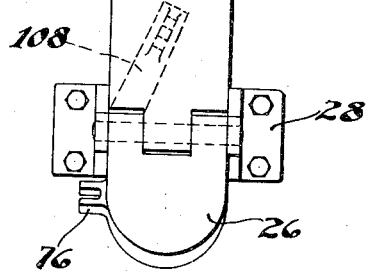
Figure 2 is an enlarged view, in plan, of the two-part manually operated treadle member.

Passing now to the brake operating feature of the mechanism, a link 74 is pivotally connected to a laterally extending boss 76 on the heel portion 26 of the treadle member, a reduced end of the link providing, together with a recessed link member 78, a telescopic or lost motion connection between the heel member 26 and the conventional brake operating lever member 80. The link member 78 is preferably pivotally secured to the brake pedal at 82. The brake pedal 80, which is pivotally mounted at 84, is provided with arms 86 and 88 connected respectively to the brakes and to a power actuator 90, the latter comprising the conventional casing 92 and piston 94, the latter connected to the arm 88. A three-way valve 96, similar to the clutch operating valve just described, is connected by conduits 98 and 100 to the conduit 42 and actuator 90, respectively, the valve being rigidly mounted in a bracket 102 secured to the floorboard or other rigid mounting. The operating link 104 of the valve is connected by a spring 106 to a projection 108, Figure 2, extending from the hinge portion of the heel member 26. In the off or neutral position of the member 26, as disclosed in Figure 1, the valve springs maintain the brake actuator vented to atmosphere.

In operation, clockwise angular movement of the heel member 26 by the operator serves to place the valve link 104 in tension to thereby open the valve 96 and place the brake actuator in communication with the manifold to evacuate the actuator and apply the brakes. The first increment of movement of the brake operating link 74 suffices to take up lost motion between 74 and 78, permitting a cracking or opening of the valve 96 without physical application of the brakes. After this lost motion is taken up, further movement of the link 74 may serve to physically apply the brakes either concurrently with their operation by power or exclusively by the effort of the operator, depending, among other variables, upon the presence or absence of vacuum, the degree of vacuum and the degree of physical effort. The proportion of the load upon the brakes derived from the actuator and/or from the physical effort of the operator is likewise dependent upon the moment arms of the various levers in the structure disclosed. Preferably, however, the maximum load from the power actuator should not exceed 50% of the maximum load upon the braking mechanism. The spring 106 in the connection between the valve and the heel member 26 obviates injury to the valve in that it is expanded during the physical operation of the brakes by the heel operated member 26.

Release of the brakes is effected by merely reversing the movement of the treadle member 26, under the action of spring 106 and the valve springs, permitting the valve to vent the actuator.

There is thus provided a very simple and effective mechanism for the more important controls of the vehicle; namely, the engine, clutch and brake, said mechanisms being rendered operative selectively and at the will of the operator by the operation of the two-part treadle device. The vehicle is declutched or placed in free wheeling phase with the treadle member 24 in neutral position, the throttle at this time being closed; counter-clockwise movement of the treadle member 24 opens the throttle to accelerate the vehicle and automatically effect clutch engagement. Operation of the heel member 26 serves to apply the brakes either by power or by the physical effort of the operator, or both, without, however, effecting the clutch or throttle control. In case of complete failure of the power actuators, both the brakes and clutch may be operated in the conventional manner by the manual operation of the pedals 30 and 80, respectively, force being applied to the ends thereof protruding from the floorboard.

There is disclosed in Figure 5 a modified form of control mechanism wherein the ends of the clutch and brake pedals are cut off below the floorboard to thereby provide stub lever members 110 and 112 contactable with stops 114 and 116, respectively. Such a structure makes possible but one foot operated control member visible from within the driving compartment of the vehicle, and this member may be positioned to suit the convenience of the operator; preferably the control member is placed in position to be conveniently operated by the right foot of the driver. In the interests of safety, however, there is provided manually operable means for actuating the clutch lever 110, such means supplementing the power means previously described, and operable, upon failure of the power means, to release the clutch.

Such supplemental means preferably comprises a Bowden wire control including a conduit 118 secured at one end to the dash 120 and housing the usual cable member 121 secured at its lower end to the member 110 and arranged to be operated by the hand of the operator through the medium of a button 122 secured to the upper end of the wire. Should the power means fail for any reason, release of the clutch may thus be effected by operation of the Bowden control. If desired, this control, or equivalent manually operable means, may be extended to the steering wheel which is possibly slightly more accessible than the dash control just described.

There is also disclosed in Figure 5, and in detail in Figure 8, means for rendering the power clutch control inoperative, which means may comprise a Bowden wire control accessible from the dash for actuating a spring pressed valve member 124 operable to cut off the communication between the control member and the actuators. Automatic declutching with operation of the throttle may thus be obviated at the will of the driver, subsequent clutch control being effected by the aforementioned Bowden control. In all other respects the mechanism of Figure 5 is similar to that of Figure 1.

In Figure 6 there is disclosed another mode of operation of the throttle, clutch and brake mechanism. The structure of this embodiment is similar to that just described and disclosed in Figure 5 with the exception of the supplemental control means. Such means comprises a hand lever 126 having overrunning or lost motion connections 130 and 132 with the clutch and brake, respectively. The connection 130 preferably comprises an angular member, U-shaped in cross section, pivotally connected to the hand lever 126 and a compression link 134. Link 134 is pivotally connected to the clutch member at 135 above its fulcrum pivot 136. Connection 132, which is in all respects similar to the aforementioned connection 130, differs only in the angular play between the lost motion member and the hand lever.

In operation, actuation of the hand lever serves to first actuate the clutch lever member to release the clutch, and further movement of the lever functions to actuate the brake operating member and manually apply the brakes.

There is thus provided a single hand operated means, operable in conjunction with and collateral to the power means, to effect a successive release of the clutch and application of the brakes. In all other respects the mechanism of Figure 6 is similar to that of Figure 1.

There is disclosed in Figure 7 another modified form of control mechanism wherein the aforementioned two-part treadle member 22 is so angularly positioned with respect to the floorboard and so positioned with respect to the conventional brake pedal 80 as to make possible a concurrent power operation of the brakes by the heel of the operator and a physical operation of the brakes by the toe of the driver. With such a construction there is no provision for direct connection between the heel operated member and the brake pedal as with the construction disclosed in Figures 1 and 2, the heel operation of the treadle member effecting solely a power operation of the brakes to the extent of approximately 50% of the maximum brake applying force.

There is thus provided in the various modifications disclosed manually operable means for operating either the brake or the clutch, or both, which means supplements the operation of these controls by the two-part treadle member, and such supplemental means may function concurrently with or exclusively of the power means.

It will be understood that while the illustrated embodiments of the invention are described as shown, a considerable latitude is to be permitted in construction within the range of the appended claims.

I claim:

1. Control mechanism for an automotive vehicle provided with an engine controlling throttle, a clutch and brakes, comprising separate means for actuating each of said mechanisms and a common means for rendering each of said separate means operative, said common means being operable in one direction to control the operation of the clutch and throttle and operable in a different direction to control the operation of the brakes, together with manually operable means, collateral to said aforementioned means, for operating said clutch and brakes, either concurrently with, or independently of the operation of said mechanisms through the intermediary of said common means.

2. Control mechanism for an automotive vehicle provided with an engine controlling throttle, a clutch and brakes, comprising separate means for actuating each of said mechanisms and a common means for rendering each of said separate means operative, said common means being operable in one direction to control the operation of the clutch and throttle and operable in a different direction to control the operation of the brakes, together with a single hand operated means, collateral to said aforementioned common means, for successively operating said clutch and brakes independently of the operation of said mechanisms through the intermediary of said common means.

3. Control mechanism for an automotive vehicle provided with an engine controlling throttle, a clutch and brakes, comprising separate means for actuating each of said mechanisms and a common means for rendering each of said separate means operative, said common means being operable in one direction to control the operation of the clutch and throttle and operable in a different direction to control the operation of the brakes, together with a Bowden wire hand operated means, collateral to said aforementioned common means, for operating said clutch either concurrently with, or independently of the operation of said clutch through the intermediary of said common means.

4. Control mechanism for an automotive vehicle provided with an engine controlling throttle, a clutch and brakes, comprising power operated means for operating said clutch, separate power operated means for operating the brakes and manually operated means for operating the throttle, each of said power operated means being provided with a control valve therefor and manually operated means operable by the toe of the operator to operate the throttle and clutch through the intermediary of the aforementioned manually operated throttle operating means and said control valve for the clutch operating means respectively, said manually operated means being operable by the heel of the operator to apply the brakes through the intermediary of said control valve for the brake-operating power operated means.

5. Control mechanism for an automotive vehicle provided with an engine controlling throttle, a clutch and brakes, comprising power operated means for operating said clutch, separate power operated means for operating the brakes and manually operated means for operating the throttle, each of said power operated means being provided with a control valve therefor and manually operated means operable by the toe of the operator to operate the throttle and clutch through the intermediary of the aforementioned manually operated throttle operating means and said control valve for the clutch operating means respectively, said manually operated means being operable by the heel of the operator to apply the brakes through the intermediary of said control valve for the brake-operating power operated means, said throttle operating means comprising a lost motion structure whereby said toe operation provides a successive operation of the clutch and throttle.

6. In an automotive vehicle provided with a throttle, a clutch and brakes, a fluid operated motor for operating the clutch, a control valve for said motor, a second fluid operated motor for operating the brakes, a control valve for said brake operating motor, force transmitting linkage for operating the throttle, means interconnecting said linkage and first mentioned valve and a foot operated treadle means operable in one direction to open the throttle and close the clutch controlling valve to engage the clutch, said treadle means being operable in a different direction to open the brake controlling valve and apply the brakes by power, said treadle means comprising independently operable toe and heel portions having a common mounting, said mounting adapted to support the instep of the operator's foot.

7. An automotive vehicle comprising throttle, clutch and brake mechanisms controllable from the driving compartment of the vehicle and a single heel and toe operated means protruding from the floorboard of the compartment and accessible to the driver, said means being operable by the toe of the driver to control the clutch and throttle and operable by the heel of the driver to apply the brakes, together with a hand operated lever also protruding from the floorboard and accessible to the driver, said lever being so connected to the clutch and brakes as to permit a successive operation of clutch and brakes in the event of the failure of the aforementioned control means.

8. An automotive vehicle comprising clutch and brake mechanism, conventional brake and clutch pedals protruding from the floorboard of the driver compartment of the vehicle, power means for operating the clutch and brake, and foot operated means for controlling the clutch and brake operating power means, said foot operated means being angularly positioned with respect to said aforementioned brake pedal so as to permit either concurrent manual operation of said foot operated means and brake pedal or selective operation of said means and pedal.

9. In a power brake and clutch operating mechanism for an automotive vehicle, a manually operable pedal structure for controlling the power, said pedal comprising heel and toe portions, each controlling the operation of one of the aforementioned controls of the vehicle, said portions each having a swivel connection with a common mounting, the heel portion being provided with an operative projection extending beneath the toe portion of said pedal structure.

VICTOR W. KLIESRATH.